(12) United States Patent
Sanabria

(10) Patent No.: US 6,976,286 B1
(45) Date of Patent: Dec. 20, 2005

(54) MOTORIZED SELF-DRAINING UTILITY BUCKET

(76) Inventor: Edwin Sanabria, 2901 Matthews Ave., apt. 2A, Bronx, NY (US) 10457

(*) Notice: Subject to any disclaimer, the term of this patent is extended or adjusted under 35 U.S.C. 154(b) by 459 days.

(21) Appl. No.: 10/277,117

(22) Filed: Oct. 21, 2002

(51) Int. Cl.$^7$ .............................................. A47L 13/50
(52) U.S. Cl. ............................ 15/264; 15/260; 68/208; 134/186; 137/355.17; 137/565.17; 210/167; 210/241; 210/455; 222/185.1; 222/333; 222/527; 222/626
(58) Field of Search .................... 15/260–264; 68/208; 134/186; 137/355.17, 565.17; 210/167, 241, 210/348, 455, 377; 222/108, 185.1, 333, 222/527, 626

(56) References Cited

U.S. PATENT DOCUMENTS

| | | | |
|---|---|---|---|
| 528,563 A | 11/1894 | Poupe et al. | |
| 1,236,156 A | 8/1917 | Finnell | |
| 1,767,840 A * | 6/1930 | Finnell | 15/264 |
| 2,372,769 A * | 4/1945 | De Remer | 68/23.3 |
| 2,477,404 A * | 7/1949 | Butt, Jr. | 210/241 |
| 2,691,986 A * | 10/1954 | Kirby | 134/58 D |
| 2,712,668 A | 7/1955 | Thiele | |
| 3,198,122 A * | 8/1965 | Kinsey, et al. | 417/36 |
| 3,777,989 A * | 12/1973 | Pacella et al. | 239/567 |
| 4,135,269 A * | 1/1979 | Marston | 15/4 |
| 4,713,859 A * | 12/1987 | Smith, Jr. | 15/264 |
| 4,798,307 A | 1/1989 | Evrard | |
| 4,908,904 A | 3/1990 | Smith, Jr. | |
| 5,615,447 A | 4/1997 | Hardesty et al. | |
| 5,961,006 A | 10/1999 | Dunham et al. | |
| 6,158,258 A | 12/2000 | Bowman | |
| 6,253,394 B1 | 7/2001 | Goyette et al. | |
| 6,279,195 B1 | 8/2001 | Biggs | |
| 6,283,170 B1 | 9/2001 | Robinson | |

* cited by examiner

*Primary Examiner*—Mark Spisich
(74) *Attorney, Agent, or Firm*—Michael I. Kroll

(57) ABSTRACT

The present invention 10 discloses a portable, self-draining utility bucket 12. The motorized drainage system of the present invention 10 comprises a bucket 12 on wheels 14, a draining pump assembly 16 which incorporates an electrical motor 18 and a retractable cord assembly 20. The wastewater from the bucket 12 is pumped through the drain hose 22 and dispensed into a sink 24. This eliminates any need to lift the bucket 12 in order to drain it, which saves pain and hard work, and eliminates possible injury at work. An on/off switch 26, a ground fault interrupter circuit breaker (GFI) 28, a clip-on fill hose 30, and a conventional mop strainer 32 are also provided. The present invention has three designs for domestic, commercial and hospital applications.

10 Claims, 9 Drawing Sheets

MOTORIZED SELF-DRAINING UTILITY BUCKET

BACKGROUND OF THE INVENTION

1. Field of the Invention

The present invention relates generally to utility buckets and, more specifically, to motorized self-draining utility buckets.

2. Description of the Prior Art

All of the utility buckets found incorporate some sort of draining features. There are a few that forces draining. Typical of these is a U.S. Pat. No. 5,961,006 issued to Dunham, et al. on Oct. 5, 1999, which utilizes a manual pump assembly.

Most utility buckets are gravity draining. A patent was issued on one such buckets to Don A. Smith on Mar. 20, 1990 as U.S. Pat. No. 4,908,904. Yet another U.S. Pat. No. 1,236,156 was issued to Walter. S. Finnell on Aug. 7, 1917 and still yet another was issued on Sep. 4, 2001 to Robert S. Robinson as U.S. Pat. No. 6,283,170.

Another patent was issued to Hardesty, et al. on Apr. 1, 1997 as U.S. Pat. No. 5,615,447. Yet another U.S. Pat. No. 6,279,195 was issued to Blyth S. Biggs on Aug. 28, 2001. Another was issued to David A. Bowman on Dec. 12, 2000 as U.S. Pat. No. 6,158,258 and still yet another was issued on Jan. 17, 1989 to William E. Evrard as U.S. Pat. No. 4,798,307.

Another patent was issued to Robert Rogan on Aug. 12, 1902 as U.S. Pat. No. 706,971. Yet another U.S. Pat. No. 2,712,668 was issued to Hazel L. Thiele on Jul. 12, 1955.

There are other devices that incorporate forced draining which bears a similarity. One such patent was issued to C. Poufe and C. Lock on Nov. 6, 1894 as U.S. Pat. No. 528,563.

Motorized draining can be found in many devices such as wash stations and dishwashers. For example, a patent was issued on one portable wash station to Goyette, et al. on Jul. 3, 2001 as U.S. Pat. No. 6,253,394.

U.S. Pat. No. 5,961,006

Inventor: Dunham, et al.

Issued: Oct. 5, 1999

A pump assembly for use with an open end volumetric container having at least a vertical portion which defines a height of the volumetric container. The pump assembly includes a substantially hollow body portion having first and second ends. A plunger member extends slidably through the first end. An inlet valve is adjacent to the second end and opens into the body. An outlet valve opening out from the body is also provided. The assembly also includes an assembly for mounting the pump assembly on the container vertical portion with the body second end positioned within the volumetric container.

U.S. Pat. No. 4,908,904

Inventor: Don A. Smith

Issued: Mar. 20, 1990

A portable cleaning container for use with a conventional mop and wringer for cleaning floors and other surfaces. The container includes a bucket with a drain opening formed through the bucket floor and closable by an elastomeric stopper supported on the end of a threaded drive rod extending through a threaded bore formed through a drive rod mount attached to the inside of the bucket within a stopper drive recess formed in the wall of the bucket and extending vertically from the floor of the bucket above the drain opening. A filter recess is formed in portions of the upper surface of the bucket floor to receive an interior filter having a planar portion that extends across the filter recess and a semitubular portion that extends about lower portions of the stopper drive recess to enclose the entrance of the drain opening to the bucket interior. Troughs in the planar portion of the interior filter and corrugations in the floor of the bucket adjacent the filter recess trap detritus when the bucket is drained. A pivoting external filter is mounted on the underside of the bucket floor for movement between a position underlaying the drain opening and a position to one side of the bucket.

U.S. Pat. No. 1,236,156

Inventor: Walter S. Finnel

Issued: Aug. 7, 1917

A mop-truck comprising a rectangular base frame; two rectangular tanks seated side by side upon said base frame with the walls of said tanks that adjoin separated from each other by a narrow vertical space; a rectangular frame attached to the tops of said two tanks; a bottom cross-bar extending through said vertical space with ends engaging opposite bars of said base-frame; a top ends engaging through said space with ends engaging the top frame, and vertical rods positioned in said space and connecting with both said bottom and top cross-bars.

U.S. Pat. No. 6,283,170

Inventor: Robert S. Robinson

Issued: Sep. 4, 2001

In one particular version, the particular ergonomic, liquid-transport container 10 includes a container body 12, a projecting lip 14 extending from the front of the container body 12, a support member 16 connected to the top of the container body 12, a lifting lever arm 18 pivotally connected to the sides of the container body 12 adjacent the back of the container body 12, a pair of non-caster wheels 20, 22 connected to the container body 12 adjacent the back, a pair of caster wheels 24, 26 connected to the container body 12 adjacent the front, and a storage compartment 28 extending from the back. The container 10 advantageously may be used in combination with a cleaning-tool wringer 30 and a cleaning tool 32.

U.S. Pat. No. 5,615,447

Inventor: Hardesty, et al.

Issued: Apr. 1, 1997

A portable cleaning container assembly having a foot activated valve assembly for selectively opening and closing a drain opening disposed in the bucket bottom wall. A directing member secured to the bucket bottom wall assists in directing the discharging cleaning solution from the drain opening to a floor drain or other drain means.

U.S. Pat. No. 6,279,195

Inventor: Blyth S. Biggs

Issued: Aug. 28, 2001

An ergonomically friendly mop bucket with wringer and method of wringing mops and conserving mop fluids including a foot operated wringer, a filter, wheel brakes and assistive drain and dumping arrangements.

U.S. Pat. No. 6,158,258

Inventor: David A. Bowman

Issued: Dec. 12, 2000

A container (10) for use in rinsing out dirt from a cleaning cloth comprises a compartment (12) adapted to hold water, means for providing fresh water, a structure (34) adapted to receive the cleaning cloth to be rinsed, and at least one nozzle (32) for supplying water free of dirt onto the cleaning cloth (FIG. 1).

U.S. Pat. No. 4,798,307

Inventor: William E. Evrard

Issued: Jan. 17, 1989

A bucket having separate reservoirs for segregating clean wash liquid, such as water, from dirty or contaminated wash liquid. In addition, the bucket contains a discharge transfer compartment for wringing a mop and providing for the immediate transfer of its discharge to a discharge storage reservoir by way of holes in the floor connecting the discharge transfer compartment and said reservoir. The floors of the discharge transfer compartment and the clean liquid reservoir are shaped with adequate slope or curvature so that particulate material discharged in either is caused to move to the lowest point for removal. Further, the clean liquid reservoir contains a shelf with holes sized to permit the passage of any residual particulate material transferred by a wrung mop entering the clean water to the curved bottom of said reservoir under said shelf so that it cannot be disturbed by the reentry of the mop in the portion of the reservoir above the shelf and thereby reenter solution and re-contaminate the mop. The clean liquid reservoir contains a drain port for emptying residual wash or bucket cleaning liquid after use into the discharge storage reservoir at the bottom of the bucket below said clean liquid reservoir. The discharge storage reservoir can be emptied of all residual liquid remaining in the bucket after use or bucket cleaning into a floor drain by means of a similar drain port without the necessity of the bucket being lifted. The bucket is mounted on four (4) casters to enhance mobility.

U.S. Pat. No. 706,971

Inventor: Robert Rogan

Issued: Aug. 12, 1902

A slop-pail having the usual bottom, an inclined supplemental bottom arranged at an elevation above the said pail-bottom to form a hot-water compartment, the body of the pail having an inlet-opening therethrough at the highest portion of the said compartment and from which point the supplemental bottom inclines downwardly toward the opposite portion of the pail to contract the said chamber, the portion of the pail-body above the supplemental bottom being free of obstructing devices and adapted to serve as a containing-receptacle, an outwardly-projected, upwardly-inclined inlet-spout around the inlet-opening of the body at a plane below the highest portion with a covering device, and a faucet communicating with the lowermost contracted portion of the said compartment at a point diametrically opposite the said opening.

U.S. Pat. No. 2,712,668

Inventor: Hazel L. Thiele

Issued: Jul. 12, 1955

This invention relates to scrub buckets, and more particularly to buckets designed for holding water for scrubbing and cleaning woodwork and windows in homes and stores and the like. The principal object of the invention is to provide a bucket of this kind having two separate compartments, one for holding soap-water and scrub rags and the other for holding rinsing water, both of the said compartments having strainer-plates seated in spaced relation from the bottoms of the compartments for providing settling basins thereunder, and through which strainer plates dirt and sediment may pass and settle into said basins, there being means also provided for draining off the water and sediment from the setting basins, as desired.

U.S. Pat. No. 528,563

Inventor: C. Poufe and C. Lock

Issued: Nov. 6, 1894

The invention consists of a fire engine and pump, which is more particularly designed for hand purposes, and composed of a supply-tank, a barrel, a piston, a cylinder with an air-chamber therein, induction and education ports, and valves therefor, and a discharge pipe on said cylinder, the construction and operation being hereinafter more fully set forth.

U.S. Pat. No. 6,253,394

Inventor: Goyette, et al.

Issued: Jul. 3, 2001

A multi-functional and transportable wash station for use in an industrial facility, the facility having overhead extending pressurized water supply lines and wastewater drainage lines. The wash station includes a body with a polygonal shaped base and a superstructure extending upwardly from the base. An inlet supply line extends from the body and is operatively connected to a selected water supply line of the facility. A selected number of both potable and non-potable water supply sources, such as faucet and sink stations, faucet and hose connections, drinking fountains and emergency shower stations are provided at specified locations of the wash station and are in communication with the inlet supply line. An electric power input is provided to the wash station and operates such features as a sewage ejection pump, a water heater and a water chiller. Drainage lines within the wash station collect dirty water from the potable and non-potable sources into a common outlet waste line extending from the station body and effluent the dirty water to a selected wastewater drainage line within the facility.

While most of these utility buckets provide adequate drainage of the wastewater toward the ground outlet below the bucket, none of them has a motorized drainage system that will push the wastewater up into a sink as hereinafter described.

SUMMARY OF THE PRESENT INVENTION

The present invention discloses a portable, self-draining utility bucket. The motorized drainage system of the present invention comprises a bucket on wheels, a draining pump assembly which incorporates an electrical motor and a retractable cord assembly. The wastewater from the bucket is pumped through the drain hose and dispensed into a sink. This eliminates any need to lift the bucket in order to drain it, which saves pain and hard work, and eliminates possible injury at work. An on/off switch, a ground fault interrupter circuit breaker (GFI), a clip-on fill hose, and a conventional mop strainer are also provided. The present invention has three designs for domestic, commercial and hospital applications.

A primary object of the present invention is to provide wastewater drainage for utility buckets.

Another object of the present invention is to provide a motorized pump system for the drainage of wastewater for utility buckets so that the wastewater can be directed upward and into a sink.

Yet another object of the present invention is to provide ease of use of a utility bucket by eliminating the need to lift the bucket in order to drain wastewater into an above ground sink.

Still yet another object of the present invention is to equip the utility bucket at all times with a drain hose that has a hook-shaped drain head, with which to drain wastewater without having to lift the bucket.

Another object of the present invention is to equip the utility bucket with a clip-on fill hose at all times, with which to fill the bucket with tap water without having to lift the bucket.

Another object of the present invention is to minimize the chance of injury and destruction of assets that may ensue in the process of said lifting and manhandling of utility buckets.

Yet another object of the present invention is to minimize financial cost of maintenance operation in regard to insurance and replacement as well as downtime due to sick leaves.

Still yet another object of the present invention is to provide convenience of accessing the electrical power source by providing a retractable electrical cord system.

Another object of the present invention is to provide an alternative source of power by using a rechargeable battery.

Yet another object of the present invention is to provide convenience of use and portability of household use of the invention by making a smaller size of the invention equipped with said rechargeable battery.

Still yet another object of the present invention is to provide a special hospital version of the invention made of stainless steel with two separate buckets independently drainable by the same pump system.

Additional objects of the present invention will appear as the description proceeds.

The present invention overcomes the shortcomings of the prior art by providing a motorized drainage pump system that will alleviate the need to lift a utility bucket into an above ground sink.

The foregoing and other objects and advantages will appear from the description to follow. In the description, reference is made to the accompanying drawings, which form a part hereof, and in which is shown, by way of illustration, specific embodiments, in which the invention may be practiced. These embodiments will be described in sufficient detail to enable those skilled in the art to practice the invention, and it is to be understood that other embodiments may be utilized, and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
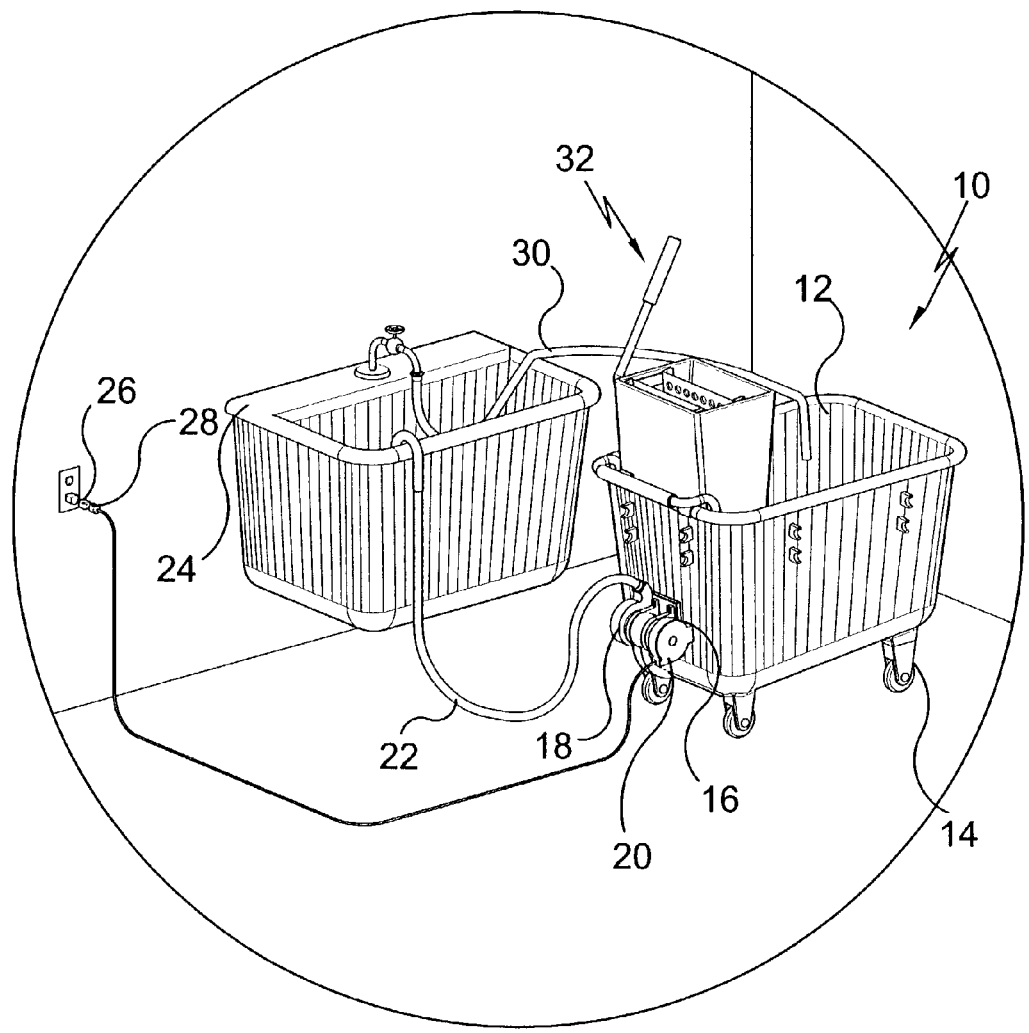
FIG. 1 is an illustrative view of the self-draining bucket in use.

With regard to reference numerals used, the following numbering is used throughout the drawings.

10 present invention
12 bucket
14 wheels
16 pump assembly
17 pump
18 motor
20 retractable cord assembly
22 drain hose
24 sink
26 on/off switch
28 GFI
30 fill hose
32 mop strainer
34 plug
36 drain hose head
38 drain channel
40 drain strainer
41 conduit
42 pump impeller
44 hose hook
46 direction arrows 48 divider
50 battery
52 housing
54 motor for battery
56 battery charger

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, since practitioners skilled in the art will recognize numerous other embodiments as well. For a definition of the complete scope of the invention, the reader is directed to the appended claims.

Turning to FIG. 1, shown therein is an illustrative view of the self-draining bucket of the present invention 10 in use. The motorized drainage system of the present invention 10 comprises a portable bucket 12 on wheels 14, a draining pump assembly 16 which incorporates an electrical motor 18 and a retractable power supply cord assembly 20. The wastewater from the bucket 12 is pumped upwardly through the drain hose 22 and dispensed into a sink 24. This eliminates any need to lift the bucket 12 in order to drain it, which saves pain and hard work, and, more importantly, eliminates possible injury at work. The present invention has three designs for domestic, commercial and hospital applications. The commercial version of the present invention 10 is shown in this FIG. 1. Also shown is an on/off switch 26, a ground fault interrupter circuit breaker (GFI) 28, a clip-on fill hose 30, and a conventional mop strainer 32 disposed on a wall of bucket 12.

Figure 2:
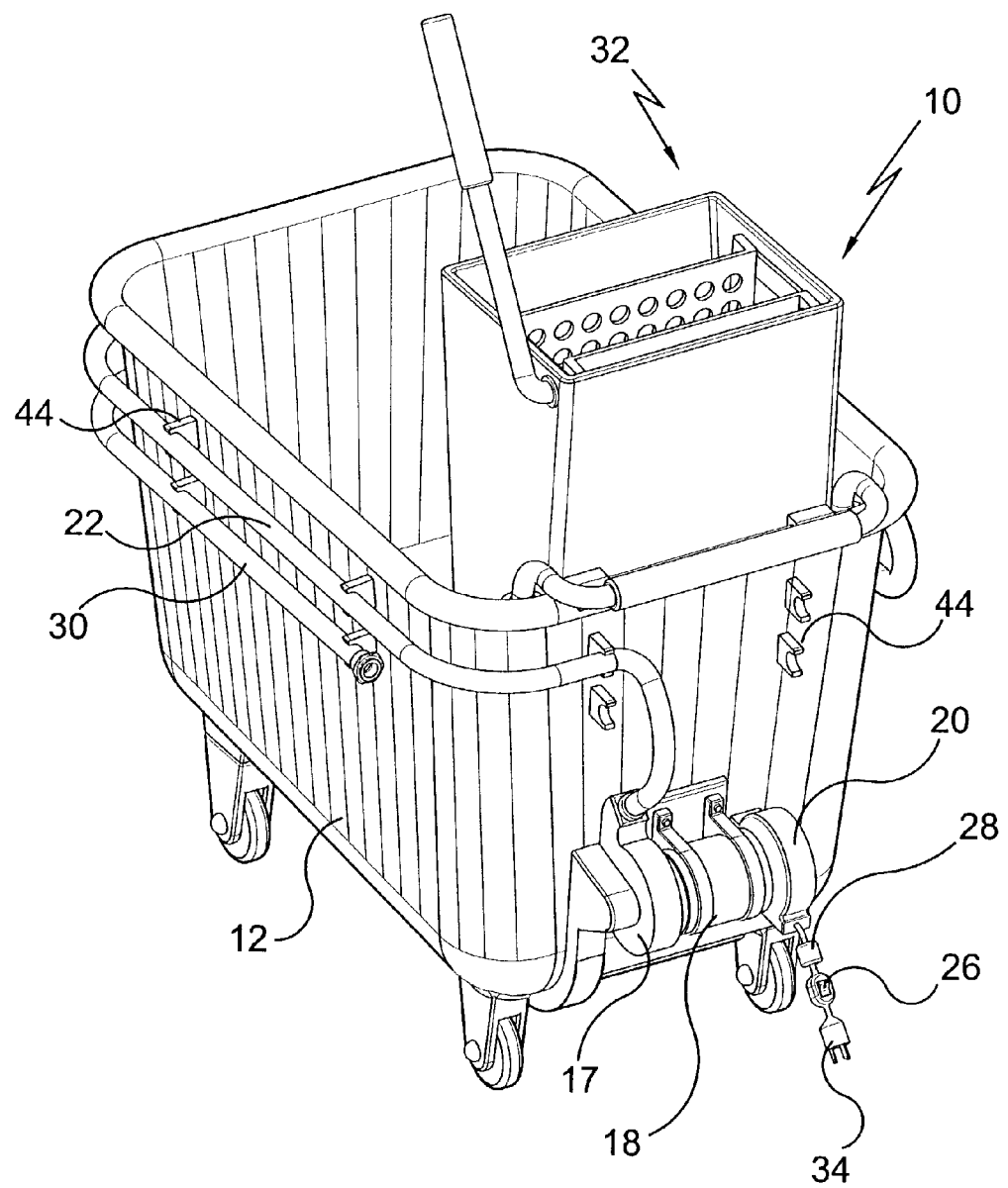
FIG. 2 is a perspective view of a commercial bucket.

Turning to FIG. 2, shown therein is a perspective view of a commercial bucket design of the present invention 10. A commercial, self-draining bucket 12 has a draining pump 17, an electrical motor 18, and a retractable, electrical cord assembly 20 as well as a draining hose 22. The draining hose 22, as well as the clip-on fill hose 30, are wrapped around the bucket 12 on multiple hose hooks 44 when not in use. The bottom of the bucket is slightly tilted or sloped toward the pump assembly 20 to facilitate the collection of the wastewater. Also shown are the mop strainer assembly 32, GFI 28, switch 26 and electrical plug 34.

Figure 3:
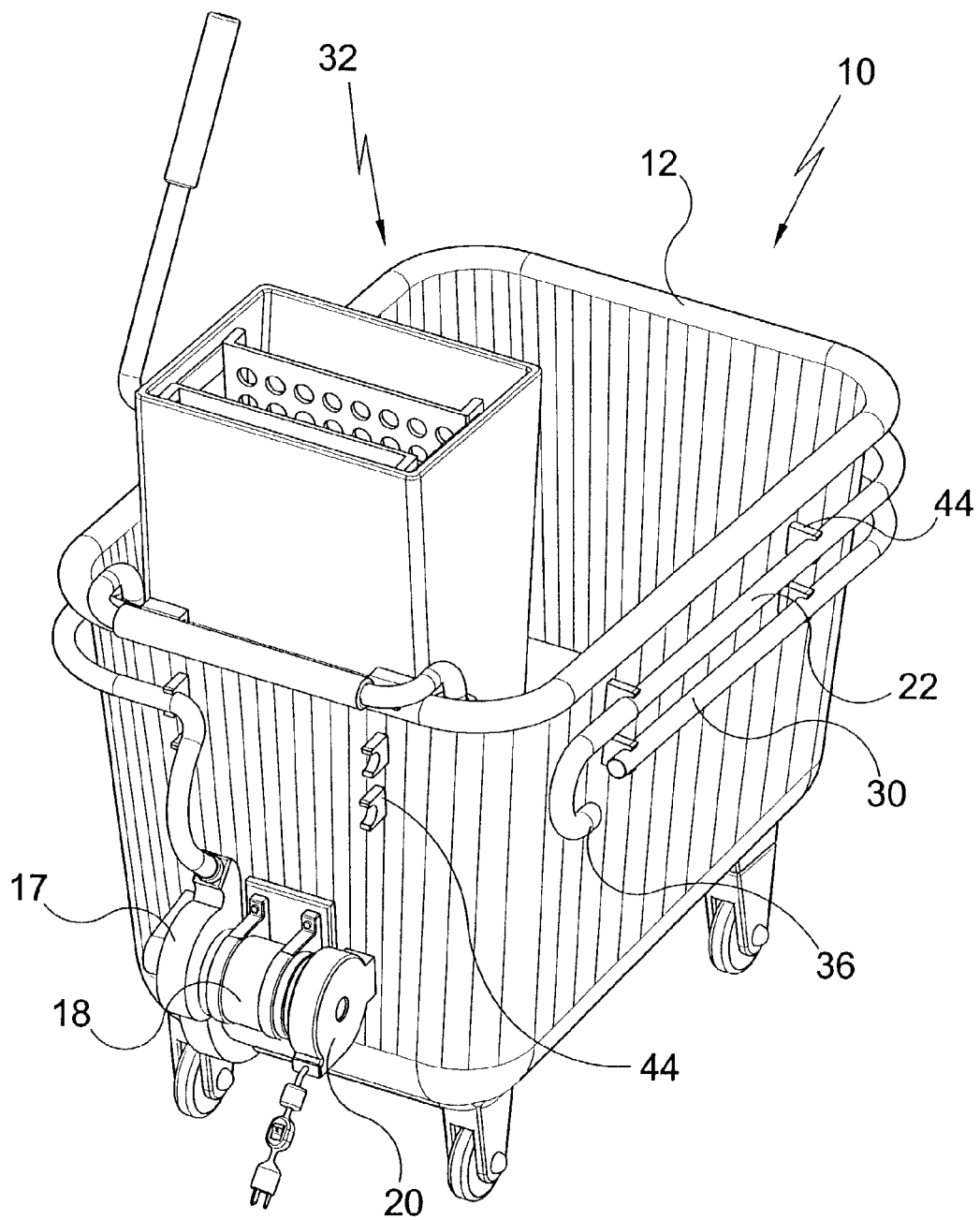
FIG. 3 is a perspective view of the commercial bucket from a different angle

Turning to FIG. 3, shown therein is a perspective view of the commercial bucket design of the present invention 10 from a different angle. Connected at the end of the flexible drain hose 22 is the drain head 36. The drain head 36 is made rigidly in the shape of a hook for easy hanging over a sink. Other elements previously disclosed are also shown.

Figure 4:
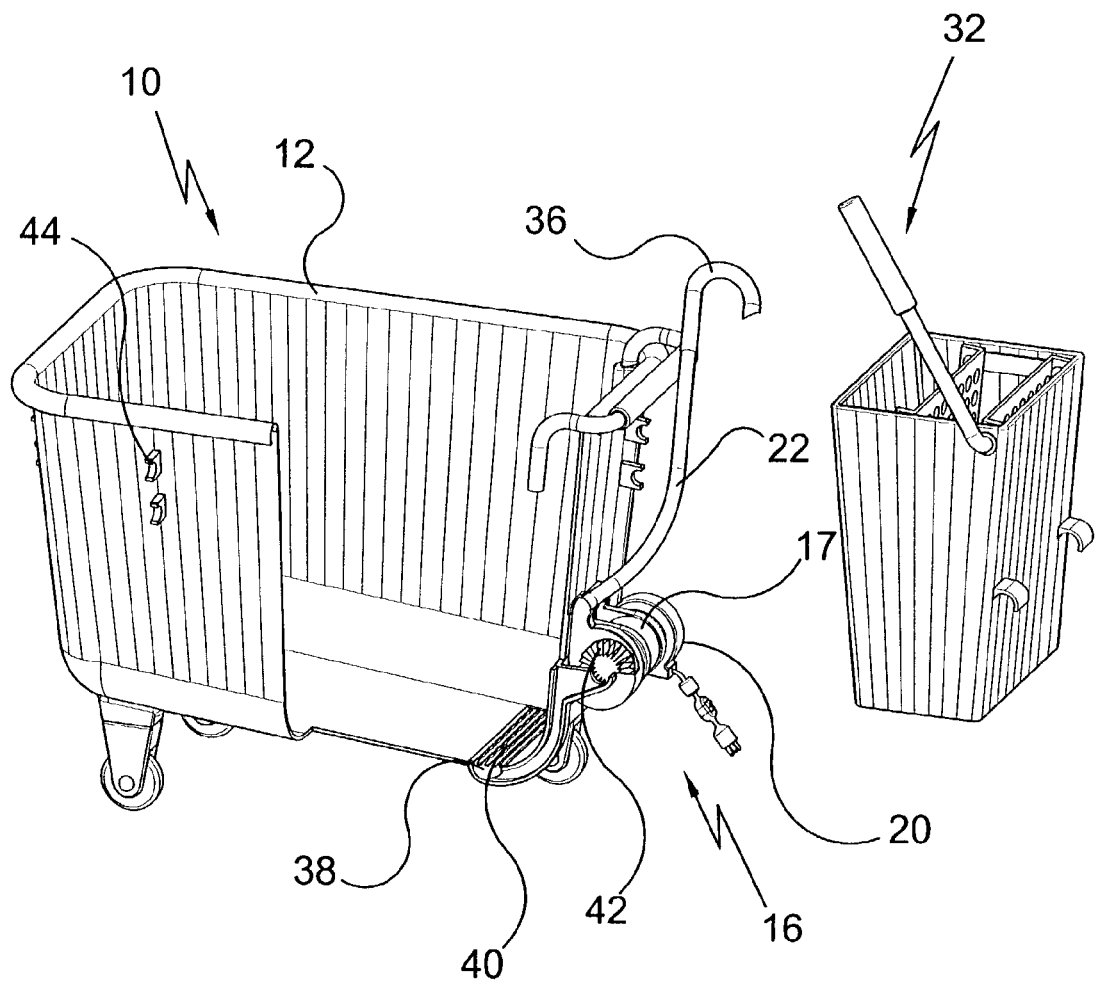
FIG. 4 is a sectional view of the drain pump assembly.
Figure 5:
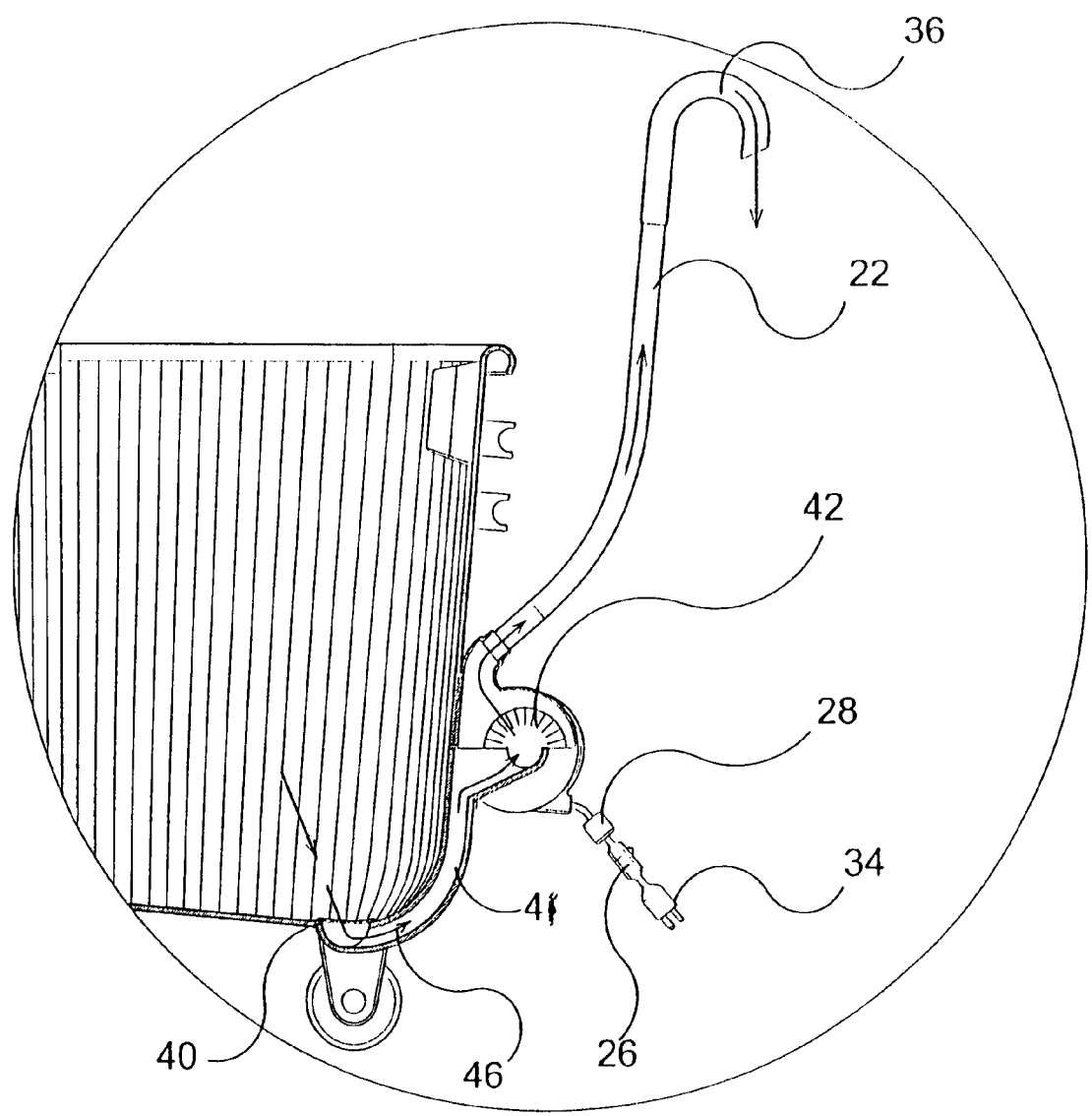
FIG. 5 is a close-up, sectional view of the drain pump assembly.

Turning to FIG. 4, shown therein is a sectional view of the drain pump assembly of the present invention 10. The bottom of the bucket 12 is sloped toward the pump assembly 16 for ease of wastewater collection having a containment wall which extends upwardly from the bottom. At the bottom of the incline is a drain channel 38 that helps to minimize the amount of uncollected wastewater. The wastewater is directed toward the pump 17, which forces it up through the drain hose 22. A drain strainer 40 is used to collect mop hairs and residue that may get stuck in the pump impeller 42. The drain strainer 14 is removable for easy cleaning and must always be in place when the bucket 12 is in use or when the pump 17 is on. Other elements previously disclosed are also shown Turning to FIG. 5, shown therein is a close-up, sectional view of the drain pump impeller 42. The view in FIG. 4 is shown here enlarged in side view. Arrows 46 indicate the flow of the wastewater through a connecting conduit 41 to the drain pump impeller 42 and the drain hose 22. Other elements previously disclosed are also shown.

Figure 6:
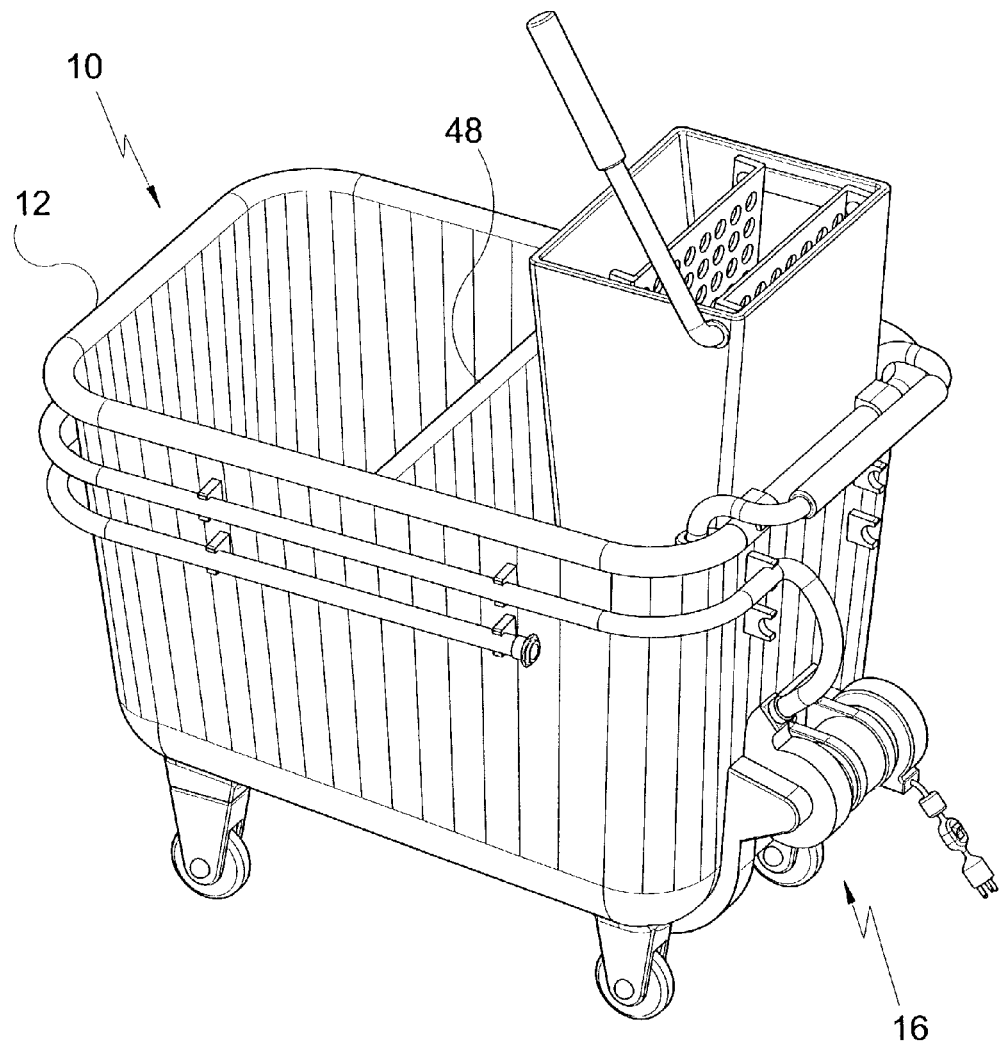
FIG. 6 is a perspective view of a hospital bucket.

Turning to FIG. 6, shown therein is a perspective view of a hospital-style bucket design of the present invention 10. The hospital version of the self-draining bucket of the present invention 10 has a divider 48 in the middle of the bucket 12, creating two chambers. The bucket 12 is made of stainless steel for use in hospitals. The same pump assembly 16 is used to drain both chambers independently. This type of bucket of the present invention 10 is used in emergency and operating rooms in hospitals. Also shown is the mop strainer 32.

Figure 7:
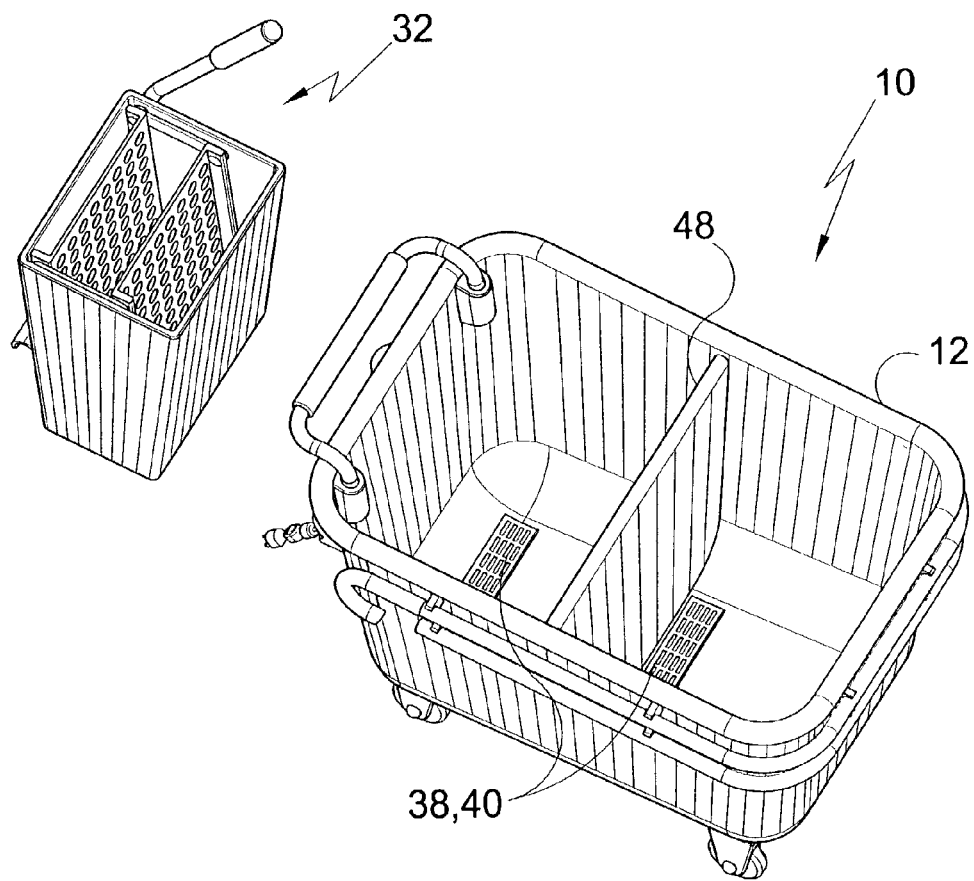
FIG. 7 is a top, perspective view of the hospital version of the self-draining bucket.

Turning to FIG. 7, shown therein is a top, perspective view of the hospital version of the self-draining bucket of the present invention 10. The divider 48 in the middle creates two separate chambers in the bucket 12, which are drained by the same pump assembly. Drain channels and strainers 38, 40 are provided at the bottom of each of the chambers. Also shown is the removable mop strainer 32.

Figure 8:
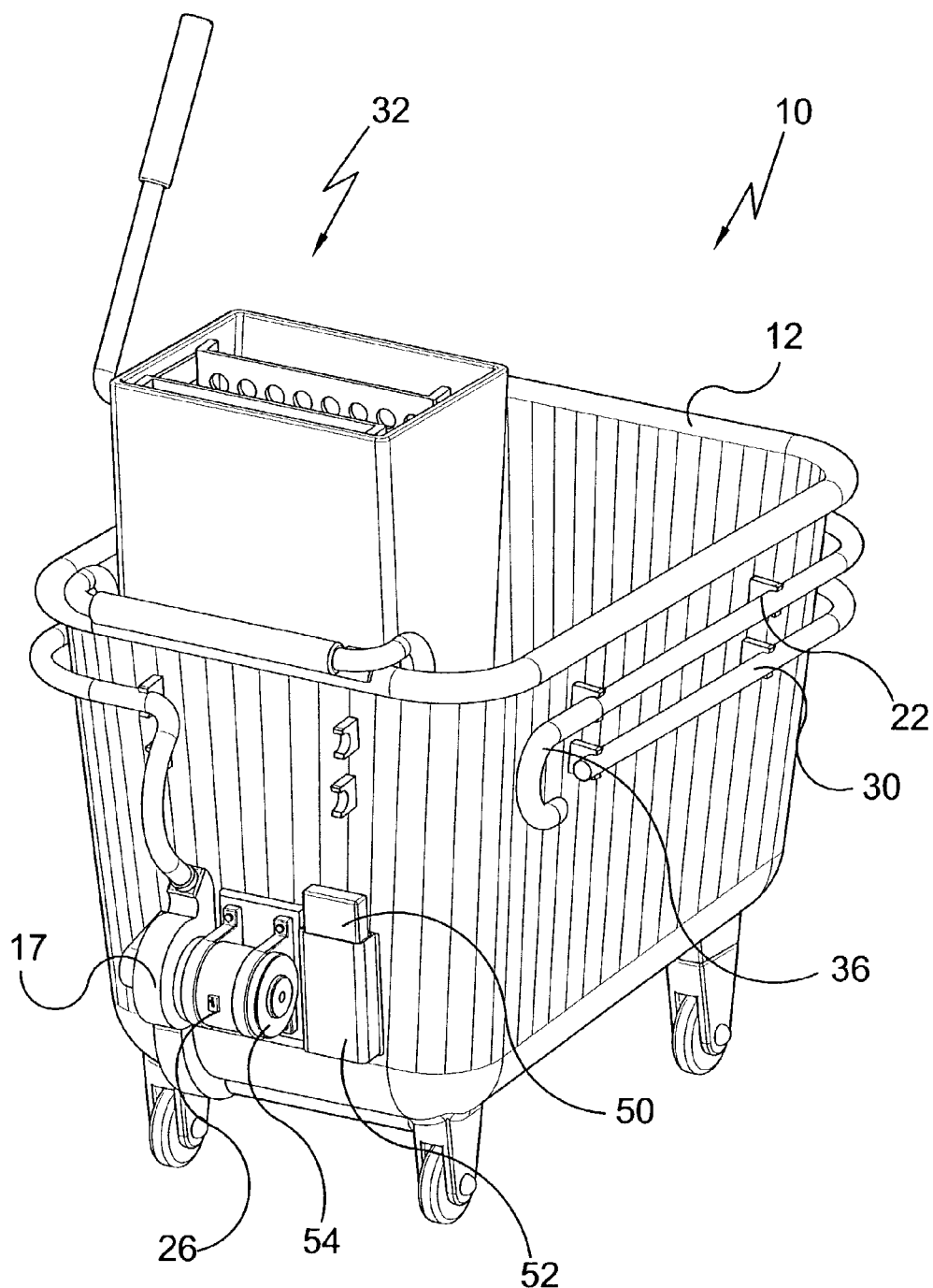
FIG. 8 is a perspective view of a domestic version of the self-draining bucket.

Turning to FIG. 8, shown therein is a perspective view of a domestic version of the self-draining bucket of the present invention 10. The domestic version of the self-draining bucket of the present invention 10 uses a rechargeable battery 50 disposed in a housing 52 attached to the bucket 12 with a matching motor 54, thereby eliminating the use of the electrical cord assembly. The domestic bucket of the present invention 10 is also made smaller in size. These aspects of the domestic version make the bucket very portable and convenient to use. Other elements previously disclosed are also shown.

Figure 9:
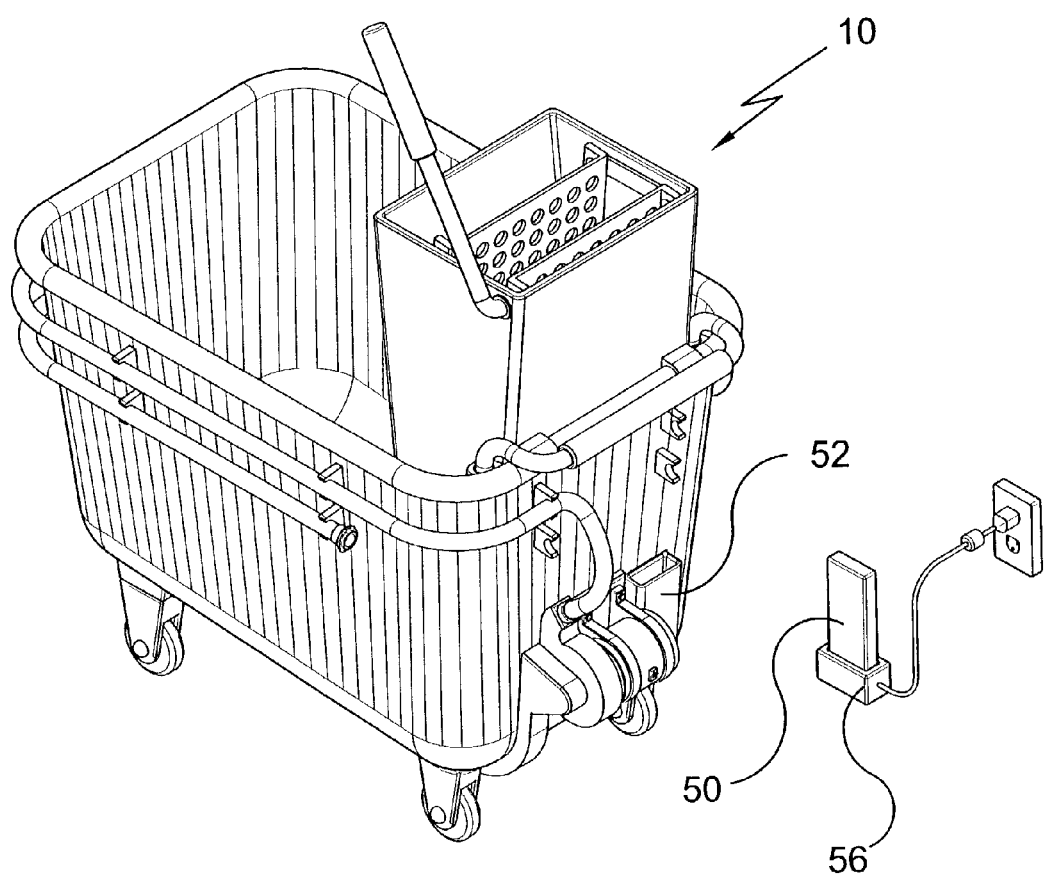
FIG. 9 is an illustrative view of the domestic bucket with the battery in charging station.

Turning to FIG. 9, shown therein is an illustrative view of the domestic bucket of the present invention 10 with the battery 50 in battery charging station 56. The use of battery 50 eliminates a cumbersome, dangling electrical cord. With an additional battery and fast recharging, continued use of the domestic bucket of the present invention 10 is ensured. Also shown is battery housing 52.

What is claimed to be new and desired to be protected by Letters Patent is set forth in the appended claims.

I claim:

1. An apparatus for a utility bucket for containing liquid having automated draining capability, comprising:
   a) a bucket, said bucket defined by a bottom having a containment wall extending upwardly therefrom for containing liquid therein, said bucket having a first side area and an opposite second side area, wherein said bottom slopes from said first side area toward said second side area to permit liquid to flow from said first side area toward said second side area;
   b) a plurality of wheels disposed on said bottom of said bucket to permit the bucket to be easily moved about;
   c) a drain disposed on said second side area of said bucket to permit liquid to drain from the bucket, said drain including:
      i) a drain channel to permit liquid to be directed to the drain; and
      ii) a drain strainer to permit debris to be removed from the liquid;
   d) means for pumping disposed on said bucket whereby water is pumped from the drain through a conduit leading from the drain to the means for pumping and then through a drain hose to a discharge point, said means for pumping including:
      i) a pump for pumping liquid, said pump having an inlet and an outlet;

ii) an electrical motor for operating said pump;

iii) a liquid conduit for connecting said drain to said inlet of said pump;

iv) a drain hose including a hook-shaped head on the end thereof to permit easy attachment to a sink for connecting said outlet of said pump to a liquid discharge paint;

e) a power supply disposed on said bucket whereby power is supplied to the means for a pumping and the means for a pumping is controlled; and f) a plurality of hose hooks being disposed about the outside of said wall of said bucket, said hose hooks for receiving said drain hose and a fill hose to provide a convenient storage location for the drain hose and a fill hose when not in use.

2. The apparatus of claim 1, further comprising a mop strainer being disposed on said wall of said bucket to permit mops to be strained into the bucket.

3. The apparatus of claim 2, wherein said bucket further comprises a divider being disposed therein to thereby form two compartments to permit the bucket to be divided into two compartments.

4. The apparatus of claim 3, wherein each of said compartments further comprises a drain, each of said drains further comprises a drain channel and a drain strainer to permit liquid to be directed to the drain and then screened.

5. The apparatus of claim 4, wherein said bucket is made of stainless steel.

6. The apparatus of claim 5, wherein said power supply comprises:

a) an electrical power cord for connection to a conventional source of electricity, said cord having an electrical plug on the end thereof;

b) a cord retraction assembly disposed on said bucket to permit the power cord to be retracted and stored therein when not in use; and, c) an on/off switch to permit the electrical motor to be controlled.

7. The apparatus of claim 6, wherein said power supply further comprises a circuit breaker.

8. The apparatus of claim 7, wherein said power supply further comprises a ground fault interrupter circuit breaker.

9. The apparatus of claim 5, wherein said power supply comprises:

a) a rechargeable battery for supplying electricity to the motor;

b) a housing disposed on said bucket for receiving said rechargeable battery; and, c) an on/off switch to permit the electrical motor to be controlled.

10. The apparatus of claim 9, wherein said power supply further comprises a circuit breaker.

* * * * *